3,167,390
TREATMENT OF WASTE ACID LIQUOR

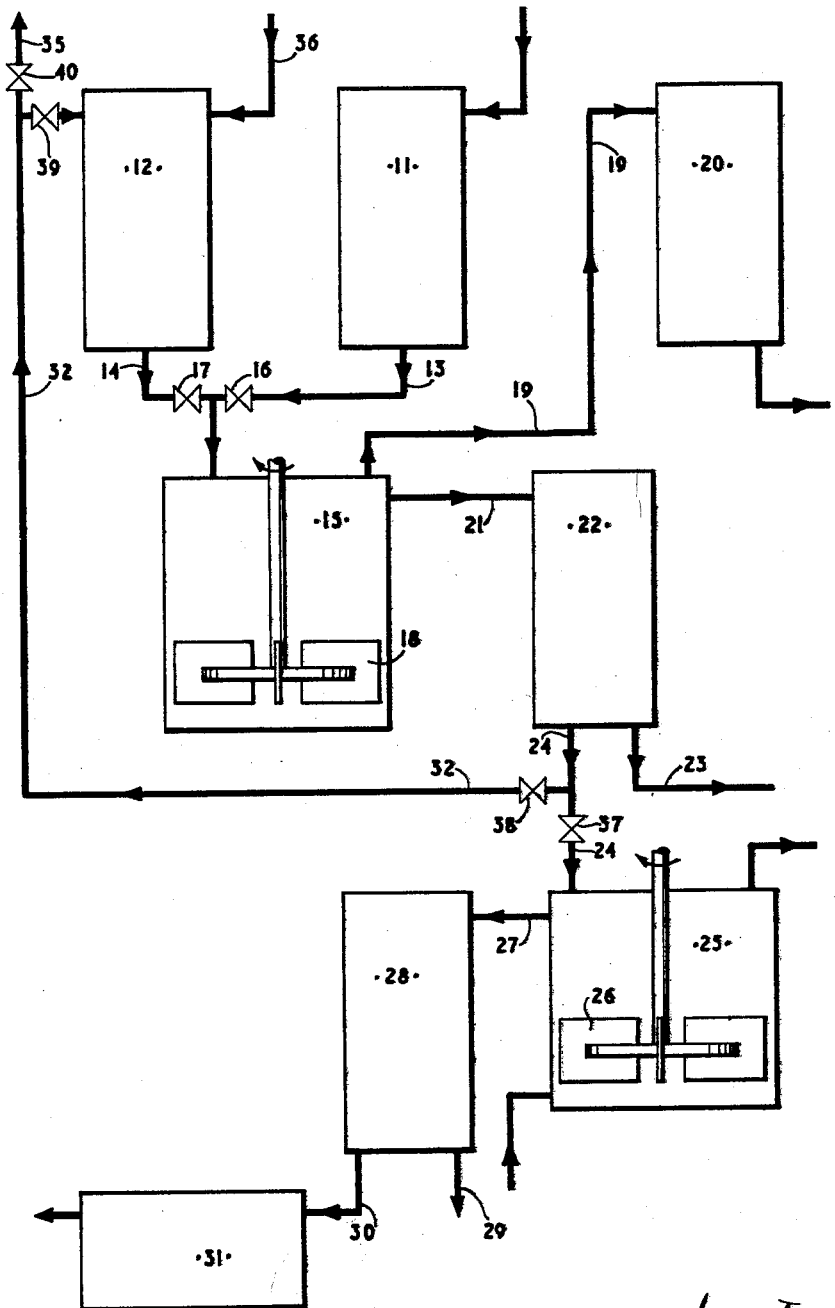

Peter Simpson, Stockport, George F. G. Clough, Adlington, and Kenneth H. Todhunter, Northenden, England, assignors to Simon-Carves Limited, Stockport, England, a corporation of Great Britain and Northern Ireland
Filed May 17, 1961, Ser. No. 110,792
11 Claims. (Cl. 23—100)

This invention relates to the treatment of waste acid liquor such as that recovered from an acid bath after the treatment of steel therein and has for its object the simplification of the recovery of commercially useful by-products from such waste acid liquor.

In the descaling of steel in steelworks, the metal is immersed in a bath of the appropriate acid, e.g., sulphuric, hydrochloric, nitric or phosphoric acid. For the purpose of illustration, only, and not in any limitative sense, we refer more particularly herein to the descaling of steel in a sulphuric acid bath.

Upon the immersion of the steel in such a bath, the sulphuric acid attacks the scale and there is a conversion of the sulphuric acid and the scale to ferrous sulphate. When the strength of the acid, due to this conversion, falls below a certain value (which is determined by the speed of conversion occurring in the bath and the economic period for which the steel may be permitted to remain in the bath) the liquor in the bath is discarded and the bath is renewed with fresh acid.

The discarded liquor, which is a solution of ferrous sulphate in sulphuric acid, contains valuable materials in solution, and previously it has not been found practicable to recover these materials or to find any use for the solution. The liquor, known in the art as "pickle liquor," has accordingly had to be discarded, with a consequential loss of the valuable materials in solution therein. The problem of the disposal of quantities of acid pickle liquor has, however, raised serious difficulties, and before it can be discarded, it is essential for the acid liquor to be neutralized by costly methods.

Steel-making establishments usually include coke-ovens for the manufacture of the metallurgical coke used in making the steel, and the gas generated in the carbonization of coal for making this coke requires it to be passed through a gas washer or scrubber for the removal of the ammonium and sulphur contents thereof. The gas may therefore be washed, or scrubbed, with water in a scrubbing tower and the liquor produced by this scrubbing contains a substantial proportion of ammonia and is highly alkaline. Thus, as has already been realized, the coke oven by-product ammonia liquor from the gas scrubbing process would provide a useful source of neutralizer for the waste acidic pickle liquor if a method of using the ammonia liquor could be found.

The treatment of sulphuric acid waste pickle liquor with ammonia liquor gives a solution of ammonium sulphate and a precipitate of ferrous hydroxide. The precipitate is gelatinous, however, and it has been found to be exceedingly difficult to separate the solids from the supernatant liquor. Where the ammonia liquor is coke-oven by-product liquor, the presence of cyanides, ferrocyanides and thiocyanates in the by-product ammonia liquor leads to an incomplete precipitation of the iron, as those anions form soluble iron compounds and thus prevent the complete precipitation of the iron from the pickle liquor. It is not essential to use coke oven by-product ammonia liquor and where such liquor is not available, or is available in insufficient quantity, synthetic ammonia liquor may be used, either in place of the coke oven liquor or, where there is merely an insufficient supply thereof, as a supplementary source of ammonia liquor supply.

The object of the present invention is to provide a method of precipitating ferrous hydroxide from a waste acid liquor in such a form that its subsequent separation from the supernatant liquor is facilitated.

According to the inventon, therefore, a method of treating waste acid liquor with ammonia liquor for the recovery of ferrous hydroxide and ammonium salts therefrom, comprises the steps of adding the ammonia liquor simultaneously with said waste acid liquor to a reactor operating under vigorous agitation at a temperature in excess of 50° C., removing reacted liquor from the reactor at the same rate as that of the addition thereto, separating the ferrous hydroxide precipitate from the reacted liquor so removed, precipitating by oxidation substantially all the iron remaining in said reacted liquor and evaporating the supernatant liquor from which said precipitates have been removed, whereby to initiate the formation of substantially iron-free ammonium salt crystals.

It will be appreciated by those skilled in the art that the precipitate will be ferrous hydroxide regardless of the type of acid used, but that the type of ammonium salt will depend upon the acid used; ammonium sulphate, chloride, nitrate or phosphate being, for instance, produced from respective sulphuric, hydrochloric, nitric or phosphoric acid pickle liquors.

But a better understanding of the invention may be obtained from the following description when this is read with reference to the accompanying diagram of a suitable flow circuit. (Although sulphuric acid is specifically referred to in this description, it will be appreciated that other suitable pickle acids may be substituted therefor within the broad scope of the invention.)

Ammonia liquor, which may be an aqueous solution of synthetic ammonia or the effluent from the gas scrubbing and ammonia liquor purifying plant of a coke oven, is collected in a liquor storage vessel 11; the scrubbing of the gas and the purification of the ammonia liquor, where this is coke oven effluent, previously having been carried out in the manner known in the art.

Waste sulphuric acid pickle liquor from steel pickling baths is collected in a pickle liquor storage vessel 12.

The ammonia liquor from the vessel 11 and pickle liquor from the vessel 12 are fed through conduits 13, 14, respectively, to the top of a reactor 15, which is a totally enclosed vessel to which heat is applied by suitable means (not shown) so that the heat within the reactor 15 does not exceed the boiling point of the liquor therein. Suitable valves 16, 17 are provided in the respective conduits 13 and 14 so that the flow in these conduits can be adjusted to provide substantially stoichiometric proportions of the two liquors.

Normally, the reactor will operate at a temperature not greater than 95° C., but it may be arranged to operate under pressure, in which case the temperature may be increased to as much as 150° C., so long as the pressure in the reactor 15 is sufficient to prevent ebullition at the chosen operating temperature. The heat for the reaction may be provided by injected steam, by an external furnace or by heat exchange means within the reactor.

The ammonia liquor fed into the reactor is substantially pure, except that, in the case of coke oven effluent, it may contain up to 0.3% pyridine, and it is fed into the reactor 15 in such a proportion that the amount of ammonia added thereto balances with the sulphate ions in the pickle liquor to form ammonium sulphate in the reaction therein.

In order to obtain the desired properties of the ferrous hydroxide, the mixture of liquors in the reactor 15 is vigorously agitated as by an agitator 18.

Any pyridine contained in the ammonia liquor is liberated in the reactor 15 and passed through the conduit 19 to a condenser 20.

The reacted suspension from the reactor 15 is passed through a conduit 21 to a centrifuge 22 wherein the solid matter in the form of ferrous hydroxide precipitate is removed and passed to storage through a conduit 23.

Liquor from the centrifuge 22 is passed through a conduit 24 to an oxidizer 25, which is provided with agitation means 26, which may be of the known turbine and sparger type. Here, the liquor is aerated to oxidize to the ferric state the iron still remaining in solution. A substantially-complete removal of iron is effected, the small amount remaining, which comprises approximately 0.2 part per million, being complexed with the small amount of organic matter present in the waste pickle-liquor.

The oxidized liquid from the oxidizer 25 is then passed through a conduit 27 to a centrifuge 28 wherein the solid matter is removed and passed to storage through a conduit 29. Ammonia liquor from the centrifuge 28 is passed through a conduit 30 to an evaporator and crystallizer 31 wherein the ammonium sulphate crystals are formed in the known way.

Some of the treated liquor from the centrifuge 22 may be by-passed from the conduit 24 through a by-pass conduit 32 to the pickle liquor storage vessel 12 for the purpose of reducing the iron concentration in the waste pickle liquor therein; the reduction in concentration improving the settling properties of the precipitate.

Treated liquor may also be recycled through the conduit 35 to the conduit 36 connecting the pickle bath (not shown) with the waste pickle liquor storage vessel 12 to prevent the crystallization of ferrous sulphate in the conduits 36 and 14. The by-pass of liquor is controlled by adjustment of the valves 37, 38, 39 and 40.

It will be appreciated by those skilled in the art that the invention is not limited to the recovery of ferrous hydroxide from any specific type of pickling acid and that although sulphuric acid, resulting in the production of ammonium sulphate crystals, has been specifically described, the invention can be used on waste pickle acid of any type. The ammonium salts produced will obviously vary with the type of acid and some of these salts, such, for instance, as ammonium sulphate and ammonium phosphate, have a commercial value of their own. Other salts may be of no particular intrinsic value and may need to be discarded, but it will be clear that it will be much more simple to dispose of unwanted ammonium salts than to dispose of large quantities of waste acid liquor, which could not be allowed to flow into normal drainage systems or into waterways.

Apart from the feature that the invention provides a method for solving the problem of the disposal of waste pickle liquor, there is also the additional feature that the problem may be solved by using another effluent of a steelworks, namely, coke oven gas-washing liquor. Such washing liquor is commonly processed to produce ammonium sulphate for fertilizers as a direct by-product. Where, however, the present invention is used in connection wtih a sulphuric acid or phosphoric acid pickle plant, the washing liquor continues to be utilized for the production of ammonium sulphate or ammonium phosphate as an end product of the process, but, meanwhile, has been used to neutralize the acid waste pickle liquor and to recover the ferrous hydroxide therefrom. Even when synthetic ammonia is used, there is little or no wastage, as ammonium sulphate or phosphate, as the case may be, may still be produced as an end product.

What we claim is:

1. A method of treating waste acid liquor containing ferrous salts with ammonia liquor containing ammonium hydroxide to form ferrous hydrate and an ammonium salt which comprises, supplying a stream of said waste acid liquor and a stream of said ammonia liquor to a body of mixed acid liquor and ammonia liquor, admixing said stream of acid liquor and said stream of ammonia liquor immediately at their entrance to said body of mixed acid liquor and ammonia liquor, maintaining said body of mixed acid liquor and ammonia liquor at a temperature in excess of 50° C. while agitating said body of liquor to mix said streams promptly into said body to form a filtrable precipitate of ferrous hydroxide and a solution of ammonium salt, removing said precipitate from said solution of ammonium salt, treating the reacted liquor with an oxygen containing gas until the ferrous salt remaining therein is oxidized to an insoluble ferric compound, removing the resulting ferric compound from said liquor and evaporating the liquor after removal of said ferric compound to form iron-free ammonium salt crystals.

2. A method according to claim 1, wherein said ammonia liquor and said waste acid liquor are added to said body of mixed acid liquor and ammonia liquor in substantially stoichiometric proportions.

3. A method according to claim 1, wherein said body of mixed acid liquor and ammonia liquor are heated to the boiling point of the liquor during mixing.

4. A method according to claim 1, comprising the step of recycling a portion of said reacted liquor to said waste acid liquor, whereby to reduce the concentration of ferrous salt in said waste acid liquor.

5. A method according to claim 1, wherein said waste acid liquor comprises the waste pickle liquor from a sulphuric acid pickle bath and the ammonium salts recovered comprise ammonium sulphate.

6. A method according to claim 1, wherein the waste acid liquor comprises the waste pickle liquor from a phosphoric acid pickle bath and the ammonium salts recovered comprise ammonium phosphate.

7. A method according to claim 1, wherein the waste acid liquor comprises the waste pickle liquor from a hydrochloric acid pickle bath and the ammonium salts recovered comprise ammonium chloride.

8. A method according to claim 1, wherein the waste acid liquor comprises the waste pickle liquor from a nitric acid pickle bath and the ammonium salts recovered comprise ammonium nitrate.

9. A method according to claim 1, wherein the ferrous hydroxide is recovered by centrifuging the precipitate from said reacted liquor.

10. A method according to claim 1, wherein the ammonia liquor used comprises the ammonia effluent liquor of a coke oven from which substantially all the carbon dioxide, hydrogen sulphide, hydrogen cyanide and other acidic impurities have previously been removed.

11. A method according to claim 10, in which said effluent liquor contains pyridine and in which said method comprises the steps of removing the pyridine content of said ammonia by-product liquor during said mixing and condensing said pyridine for the recovery thereof.

References Cited by the Examiner

UNITED STATES PATENTS

| | | | |
|---|---|---|---|
| 1,824,936 | 9/31 | Travers | 23—200 |
| 2,056,283 | 10/36 | Lawrence et al. | 23—100 X |
| 2,165,344 | 7/39 | Colton. | |
| 2,279,585 | 4/42 | Wald et al. | 23—119 X |
| 2,419,240 | 4/47 | Wilson | 23—200 X |
| 2,443,765 | 6/48 | Francis | 23—119 |
| 2,511,305 | 6/60 | Tiddy | 23—119 |
| 2,529,874 | 11/50 | Hoak | 23—100 X |
| 2,584,280 | 2/52 | Meissner et al. | 23—119 |
| 2,849,288 | 8/58 | Langguth | 23—107 |
| 2,880,061 | 3/59 | Muns et al. | 23—119 X |
| 3,016,286 | 1/62 | Masukawa et al. | 23—119 X |

FOREIGN PATENTS 644,826  10/50  Great Britain.

MAURICE A. BRINDISI, *Primary Examiner.*

GEORGE D. MITCHELL, *Examiner.*